(12) United States Patent
Shimanaka (10) Patent No.: US 11,535,300 B2
(45) Date of Patent: Dec. 27, 2022

(54) VEHICLE BODY STRUCTURE

(71) Applicant: Mazda Motor Corporation, Hiroshima (JP)

(72) Inventor: Tsuneki Shimanaka, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 17/357,983

(22) Filed: Jun. 25, 2021

(65) Prior Publication Data
US 2022/0001933 A1 Jan. 6, 2022

(30) Foreign Application Priority Data

Jul. 1, 2020 (JP) .............................. JP2020-113840

(51) Int. Cl.
*B62D 25/06* (2006.01)
*B62D 25/02* (2006.01)
*B62D 27/02* (2006.01)
B62D 25/04 (2006.01)

(52) U.S. Cl.
CPC ........... *B62D 25/06* (2013.01); *B62D 27/026* (2013.01); *B62D 25/02* (2013.01); *B62D 25/04* (2013.01)

(58) Field of Classification Search
CPC ....... B62D 25/02; B62D 25/06; B62D 29/005; B62D 27/026
USPC .............................. 296/203.01, 203.03, 210
See application file for complete search history.

(56) References Cited

U.S. PATENT DOCUMENTS 2,210,533 A * 8/1940 Fisher .................... B62D 31/00
296/203.01

FOREIGN PATENT DOCUMENTS

| JP | 2015-151044 A | 8/2015 | |
| JP | 2019077381 A * | 5/2019 | ............. B62D 25/02 |
| KR | 101454726 B1 * | 10/2014 | ............. B62D 25/10 |

* cited by examiner

*Primary Examiner* — Dennis H Pedder
(74) *Attorney, Agent, or Firm* — Xsensus LLP (57) ABSTRACT

A vehicle body structure includes: a pair of roof side rails, each of which constitutes at least one each of closed cross sections and extends in a vehicle longitudinal direction; and a roof panel that is stretched between the pair of roof side rails and extends in a vehicle width direction. The roof panel has: a body section that extends in the vehicle width direction; and a flange section that is provided to both end portions in the vehicle width direction of the body section and extends in the vehicle width direction along a lower surface of the closed cross section. The flange section is fixed to a lower surface of the closed cross section.

15 Claims, 6 Drawing Sheets

VEHICLE BODY STRUCTURE

CROSS-REFERENCE TO RELATED APPLICATION

The present application claims priority to Japanese App. No. 2020-113840 filed Jul. 1, 2020, the entire content and disclosure of which is incorporated by reference herein in its entirety.

TECHNICAL FIELD

Embodiments of the present disclosure relate to a vehicle body structure.

BACKGROUND ART

Conventionally, various structures have been available to fix both end portions in a vehicle width direction of a roof panel in a vehicle body to a pair of roof side rails.

In the general vehicle body structure, as disclosed in Patent document 1, a bracket that is provided to each of the paired roof side rail is joined to a flange that is provided to each of the end portions in the vehicle width direction of the roof panel by welding or the like.

More specifically, the roof panel disclosed in Patent document 1 includes: a step portion that is formed by folding each of the end portions in the vehicle width direction downward; and the flange that is formed by folding a lower end of the step portion outward in the vehicle width direction. The flange of the roof panel is superposed on the bracket, which is provided in a manner to be projected inward in the vehicle from a side surface on an inner side in the vehicle width direction of each of the paired roof side rails, from above and is welded thereto.

PRIOR ART DOCUMENTS

Patent Documents

[Patent document 1] JP-A-2015-151044

SUMMARY

According to one or more aspects of the present disclosure, a vehicle body structure of an automobile is disclosed or provided. The vehicle body structure can comprise: a pair of roof side rails that constitutes at least one closed cross section and extends in a vehicle longitudinal direction; and a roof panel that extends between the pair of roof side rails in a vehicle width direction. The roof panel can have: a body section that extends in the vehicle width direction; and a flange section that is provided to both end portions in the vehicle width direction of the body section and extends in the vehicle width direction along a lower surface of the at least one closed cross section. The flange section can be fixed to the lower surface of the at least one closed cross section.

DETAILED DESCRIPTION

A detailed description will hereinafter be made on a preferred embodiment of the present disclosure with reference to the accompanying drawings.

In the above vehicle body structure discussed in the Background section, the roof side rails may be firmly fixed by superposing the flange at each of the end portions in the vehicle width direction of the roof panel to the bracket on the roof side rail side from above and welding the flange thereto. In this structure, since the step portion is provided between a roof panel body and the flange, a welded portion between the flange and the bracket may be less likely to be seen from the outside. However, there is a problem that, due to presence of the step portion on each side in the vehicle width direction of the roof panel, it can be difficult to improve design quality of the vehicle body.

Embodiments of the present disclosure have been made in view of the above circumstance (and other circumstances) and therefore can have a purpose (among other purposes) of providing a vehicle body structure capable of simultaneously achieving firm fixing between a roof panel and a roof side rail and improvement in design quality of a vehicle body.

In order to solve the above problem and other problems, a vehicle body structure according to embodiments of the present disclosure can be a vehicle body structure of an automobile that can include: a pair of roof side rails that can constitute at least one closed cross section and can extend in a vehicle longitudinal direction; and a roof panel that can be stretched between the pair of roof side rails and can extend in a vehicle width direction. The roof panel can have: a body section that extends in the vehicle width direction; and a flange section that can be provided to both end portions in the vehicle width direction of the body section and can extend in the vehicle width direction along a lower surface of the closed cross section. The flange section can be fixed to the lower surface of the closed cross section.

With such a configuration, when the flange section of the roof panel is fixed to the at least one lower surface of the closed cross section of the roof side rail, it can be possible to increase strength against a tensile load that is applied to the roof panel. In addition, since the flange section is fixed to the lower surface of the closed cross section of the roof side rail, the flange section may not be visually recognized from the outside, and a step portion that is provided in the conventional vehicle body structure may not be formed. As a result, it can be possible to simultaneously achieve firm fixing between the roof panel and the roof side rail and improvement in design quality of the vehicle body.

In the above vehicle body structure, the flange section can be adhered to the lower surface of the closed cross section by an adhesive and can be fastened thereto by a fastener (including one or more fasteners).

With such a configuration, the flange section can be fixed by both of the adhesion to the lower surface of the closed cross section of the roof side rail using the adhesive and fastening using the fastener (or fasteners). Thus, the roof panel can further firmly be fixed to the roof side rail. That is, in this configuration, since the flange section may be less likely to be detached from the lower surface of the closed cross section of the roof side rail due to fastening by the fastener, it can be possible to suppress separation of the adhesive. In addition, due to the adhesion by the adhesive, the flange section may be less likely to be shifted along the lower surface of the closed cross section. Thus, it can be possible to prevent damage caused by concentration of stress on the flange section at a position of the fastener. Due to these synergistic effects, it can be possible to further firmly fix the roof panel to the roof side rail as described above.

In the above vehicle body structure, the roof side rail can be constructed of a first frame and a second frame that is adhered to the first frame, where each of the first frame and the second frame can have the closed cross section, the closed cross section of the second frame can extend in the vehicle width direction in a manner to cover the first frame and the flange section from above, the lower surface of the closed cross section of the second frame can have: a first adhesive surface that can be adhered to an upper surface of the first frame; and a second adhesive surface that can be adhered to the flange section, and the first adhesive surface and the second adhesive surface can be arranged on the substantially same plane.

With such a configuration, the roof side rail can be constructed of the first frame and the second frame, and in the closed cross section of the second frame, the first adhesive surface and the second adhesive surface, which can be arranged on the substantially same plane, can be adhered to the upper surface of the first frame and the flange section. In this configuration, even in the case where a load in a shearing direction that may be applied to the roof panel is applied to the second frame via the second adhesive surface, which can be adhered to the flange section, it can be possible to transmit the load applied in the shearing direction to the first frame via the first adhesive surface that can be on the substantially same plane as the second adhesive surface. In this way, a load applied to the first adhesive surface in an out-of-plane direction, that is, the load that may cause separation of the first adhesive surface, may be less likely to be generated. As a result, it can be possible to increase the strength of the roof panel against the load applied in the shearing direction.

In the above vehicle body structure, the closed cross section of the second frame can have an inward extending section that extends to an inner side in the vehicle width direction from a position above the first frame in the second frame, and the second adhesive surface can be arranged on a lower surface of the inward extending section.

With such a configuration, the second adhesive surface, which can be adhered to the flange section of the roof panel, in the second frame can be arranged on the lower surface of the closed cross section of the second frame, more specifically, the lower surface of the inward extending section that extends to the inner side in the vehicle width direction in the closed cross section. In this way, it can be possible to support the second adhesive surface, which can be adhered to the flange section, by the closed cross section of the second frame and thus can secure the tensile strength of the second adhesive surface. In addition, the inward extending section of the second frame can extend to the inner side in the vehicle width direction from the position above the first frame and approaches the body section of the roof panel. In this way, it can be possible to reduce a clearance between the body section of the roof panel and the second frame, which can improve the design quality of the vehicle body.

In the above vehicle body structure, the second frame further can have a third adhesive surface that can be oriented to a different direction on an outer side in the vehicle width direction of the first adhesive surface, where the first frame further can have a side surface that is adjacent to the upper surface, and the first adhesive surface can be adhered to the upper surface of the first frame, and the third adhesive surface can be adhered to the side surface of the first frame.

With such a configuration, not only to the first adhesive surface of the second frame but also the third adhesive surface, which can be oriented in the different direction from the first adhesive surface, can be adhered to the first frame. Accordingly, even in the case where the load in the shearing direction, which may be applied to the roof panel, may be applied to the second frame, such a possibility can be reduced that the second frame can be separated from the first frame and moves relative to the first frame.

In the above vehicle body structure, the second frame can have higher tensile strength and can be lighter than the first frame, and center of a figure of the second frame can be arranged on an outer side in the vehicle width direction of center of a figure of the first frame with respect to vehicle center.

With such a configuration, the center of the figure of the second frame, which can have the higher tensile strength and can be lighter than the first frame, can be arranged on the outer side in the vehicle width direction from the center of the figure of the first frame with respect to the vehicle center. In this way, the modification of the vehicle body can be suppressed while moment of inertia with respect to the vehicle center can be reduced during travel of the vehicle. Thus, it can be possible to simultaneously reduce weight of the vehicle body and improve steering stability of the vehicle. In addition, compared to a case where the single frame having the plural closed cross sections is formed of the same material such as aluminum, it can be possible to suppress an increase in external dimensions of the first frame and the second frame formed of the different types of the materials, and it also can be possible to improve freedom of design of the vehicle body.

According to the vehicle body structure of one or more embodiments the present disclosure, it can be possible to simultaneously achieve firm fixing between the roof panel and the roof side rail and improvement in the design quality of the vehicle body.

A vehicle body structure illustrated in FIGS. 1 to 3 and FIG. 7 can be a vehicle body structure of a vehicle 1 such as an automobile, and can include: a pair of roof side rails 3 constituting an upper portion of a vehicle body 2; a front windshield 4; a roof panel 5 that can be stretched between the paired roof side rails 3 and that can extend in a vehicle width direction Y; and a pair of doors 6 attached to both sides of the vehicle body 2 in the vehicle width direction Y.

Figure 1:
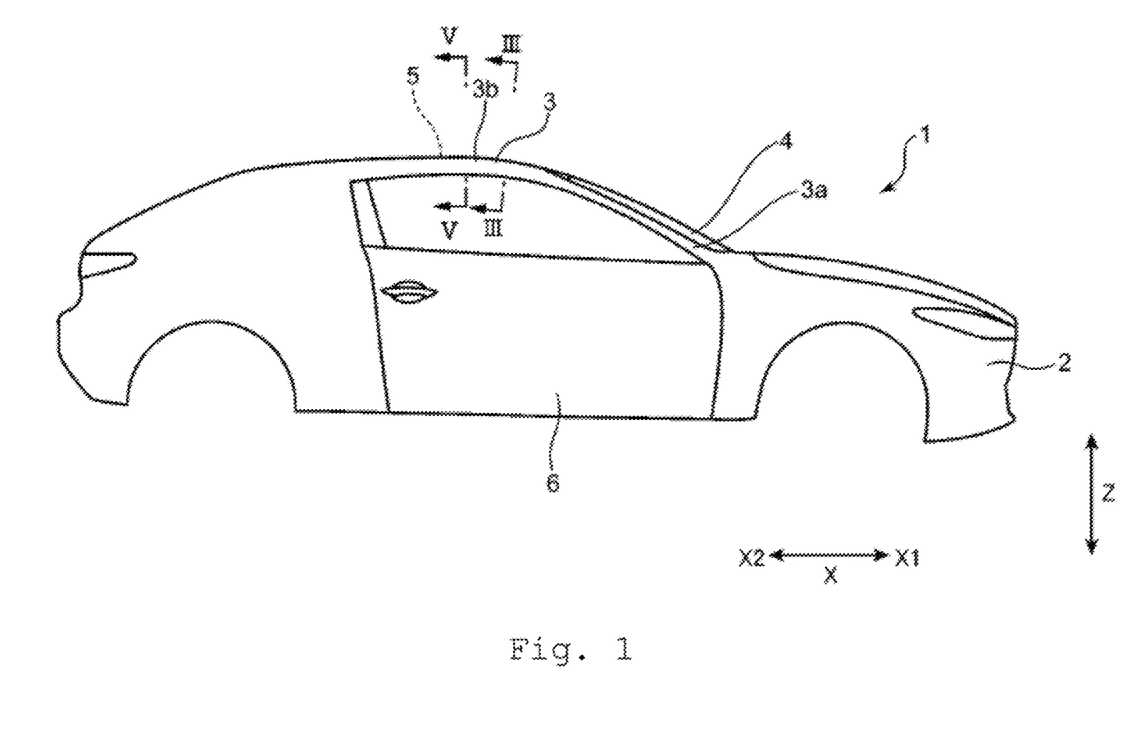
FIG. 1 is a side view illustrating an overall configuration of a vehicle having a vehicle body structure according to one or more embodiments of the present disclosure.

Each of the paired roof side rails 3 can have: a roof side rail body section 3b that extends in a vehicle longitudinal direction X; and a pillar section 3a that extends downward in the vehicle 1 and to a vehicle front side X1 from a front end of the roof side rail body section 3b.

Figure 2:
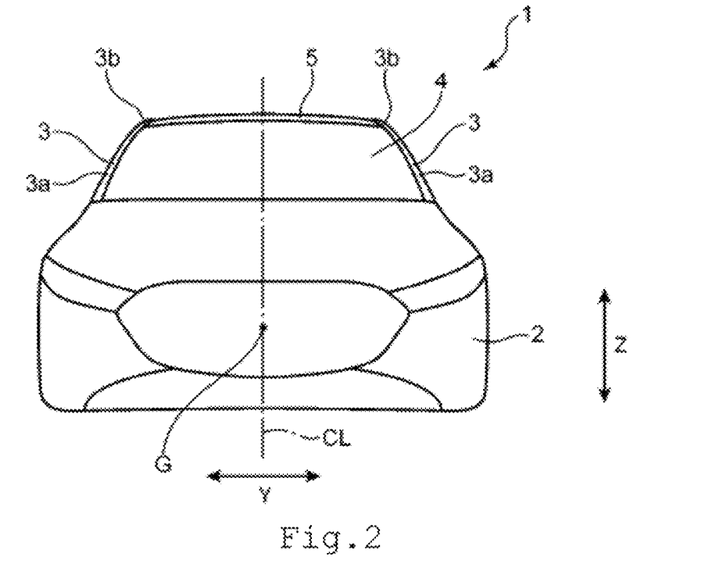
FIG. 2 is a front view of the vehicle in FIG. 1.
Figure 3:
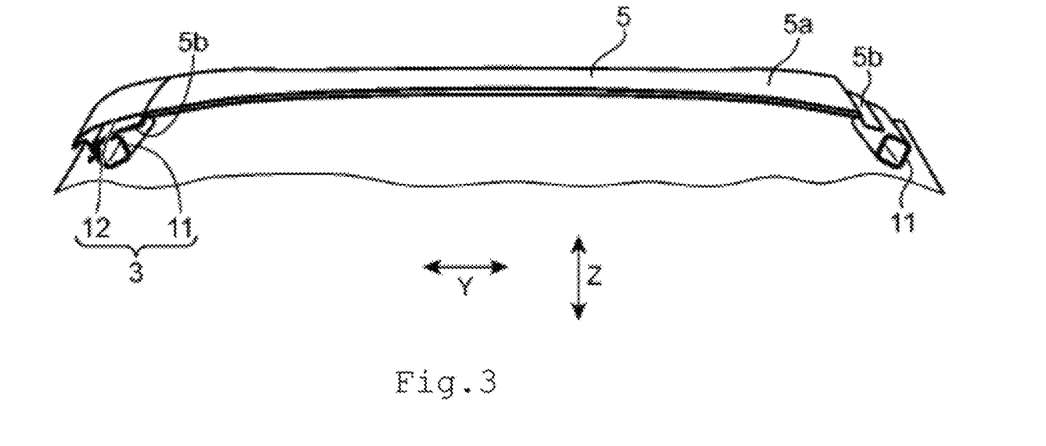
FIG. 3 is a cross-sectional view that is taken along line III-III in FIG. 1.
Figure 4:
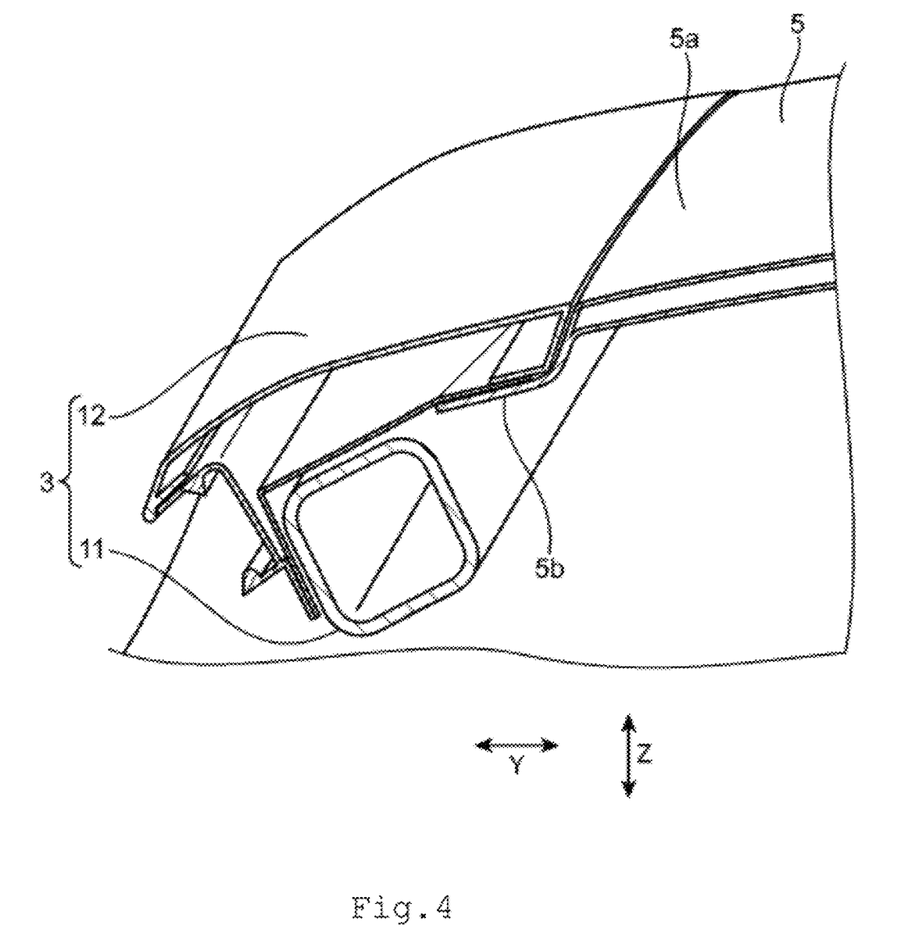
FIG. 4 is an enlarged cross-sectional view of a left roof side rail in FIG. 3 and a periphery thereof.
Figure 5:
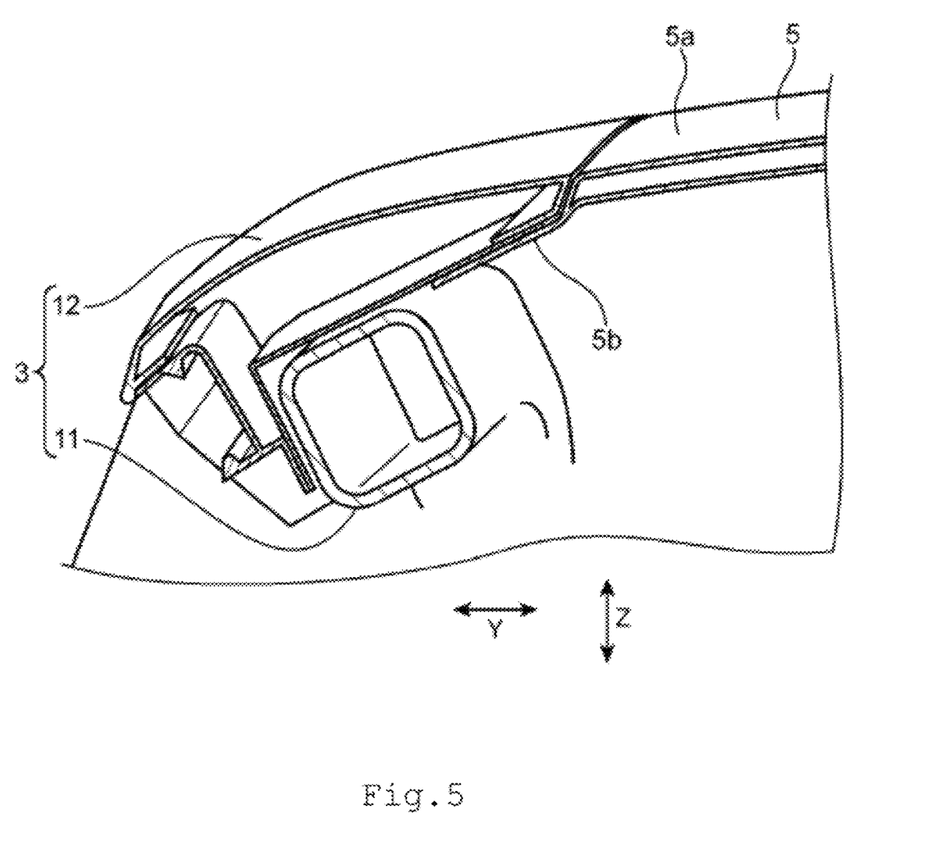
FIG. 5 is an enlarged cross-sectional view of the left roof side rail in FIG. 4 and the periphery thereof in a cross section that is taken along line V-V in FIG. 1.

The front windshield 4 can be provided to cover a portion between the pillar sections 3a of the paired roof side rails 3. Each end of the front windshield 4 can extend upward and to a vehicle rear side X2 along the pillar section 3a.

The roof panel 5 can cover a portion between the roof side rail body sections 3b of the paired roof side rails 3 and can constitute a ceiling of the vehicle body 2. Each end of the roof panel 5 can extend to the vehicle rear side X2 along the roof side rail body section 3b.

Figure 6:
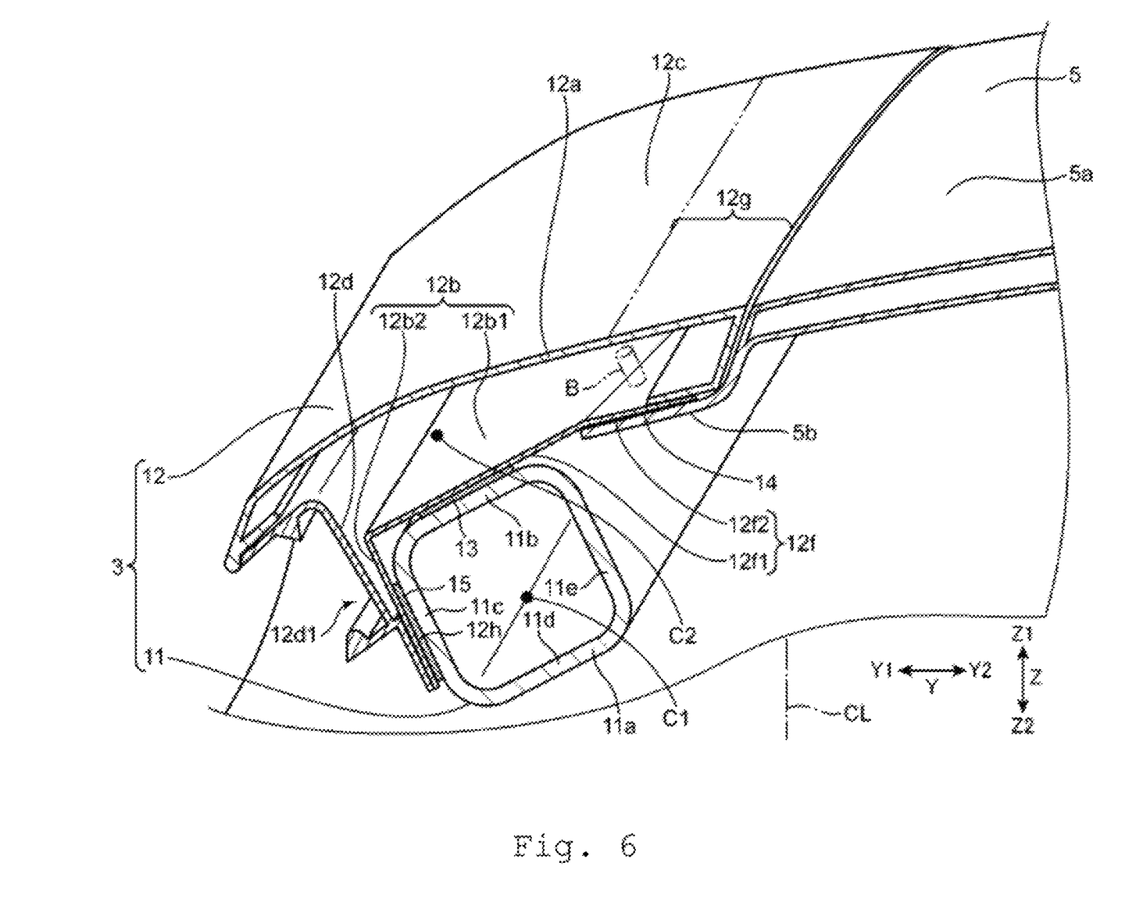
FIG. 6 is an enlarged cross-sectional view of a first frame and a second frame of the roof side rail and a flange section of a roof panel in FIG. 4.
Figure 7:
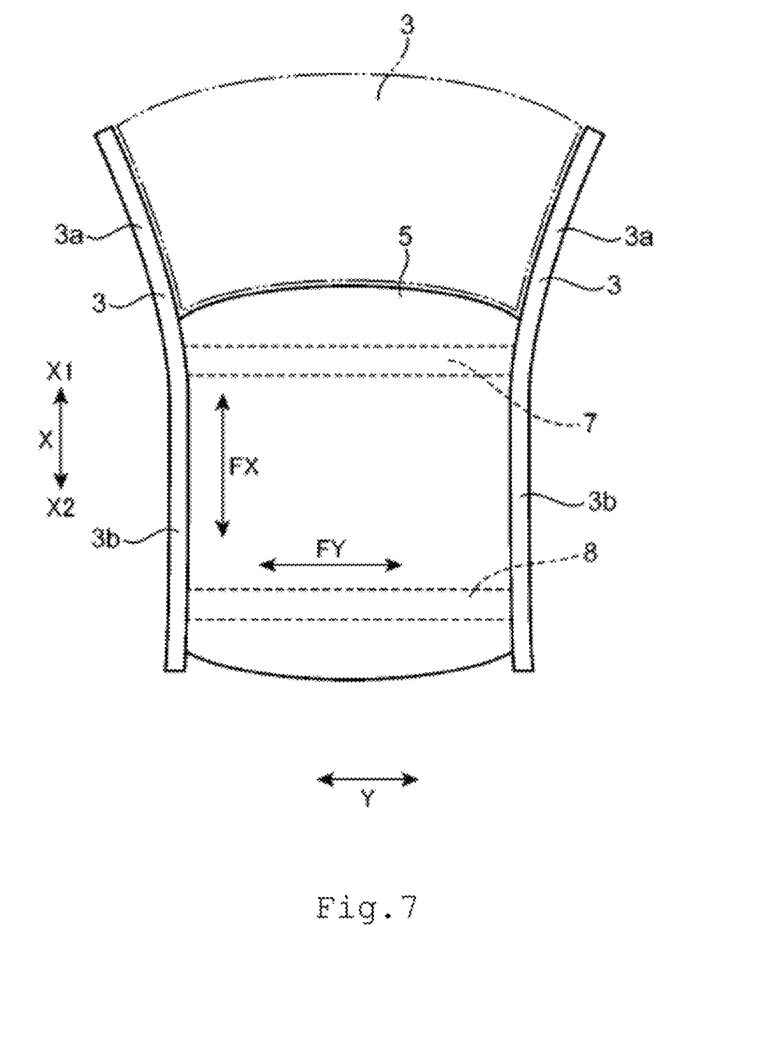
FIG. 7 is a plan view illustrating a pair of the roof side rails and the roof panel of the vehicle body in FIG. 1.

More specifically, the roof panel 5 can have: a body section 5a that extends in the vehicle width direction Y; and a flange section 5b that can be provided to both end portions of the body section 5a in the vehicle width direction Y and can extend in the vehicle width direction Y along a lower surface 12f (see FIG. 6) of a closed cross section 12a of the roof side rail 3. As illustrated in FIG. 7, in a state where the roof panel 5 is mounted on two beams 7, 8, each of which can be stretched between the paired roof side rails 3 and can extend in the vehicle width direction Y, the flange sections 5b at both ends of the paired roof side rails 3 can be fixed to the paired roof side rails 3.

Each of the paired roof side rails 3 can be constructed of a composite frame that can be formed from plural types of materials. More specifically, as illustrated in FIGS. 3 to 6, each of the paired roof side rails 3 can be constructed of a first frame 11 and a second frame 12. The first frame 11 and the second frame 12 can be aligned in the vehicle width direction Y and a vertical direction Z and can extend in the vehicle longitudinal direction X.

The first frame 11 is a long or elongate body (e.g., elongate cylinder or elongate cube) that is formed of a first material, can have a closed cross section 11a, and extends in the longitudinal direction X of the vehicle 1. The first frame 11 may be hollow.

For example, the first frame 11 can be manufactured by using, as the first material, a metal material such as aluminum or steel that can be rigid and can be manufactured inexpensively, or the like.

The first frame 11 can have a polygonal shape, such as illustrated in FIG. 6, for instance, with plural sides 11b, 11c, 11d, 11e in a front cross-sectional view of the vehicle 1, and can have a rhomboid shape in this embodiment. In other words, these sides 11b, 11c, 11d, 11e can constitute the closed cross section 11a in the rhomboid shape (the polygonal shape).

The sides 11b, 11c, 11d, 11e can have a first outer side lib and a second outer side 11c as at least two outer sides with which a surface constituting an outer circumferential surface of the first frame 11 can face an outer side Y1 in the vehicle width direction. The first outer side 11b can face the outer side Y1 in the vehicle width direction of the first frame 11 and obliquely upward. The second outer side 11c can face the outer side Y1 in the vehicle width direction of the first frame 11 and obliquely downward.

Meanwhile, the second frame 12 can include at least two fixed surfaces 12b1, 12b2, which will be described below, as surfaces that can be fixed to the at least two outer sides 11b, 11c of the first frame 11, respectively.

Accordingly, the first frame 11 can have the at least two outer sides 11b, 11c, each of which can face the outer side in the vehicle width direction Y. Thus, compared to a case where only one outer side is provided (for example, only a single outer side of the first frame 11 faces the outer side Y1 in the vehicle width direction), it can be possible to secure a large area for fixing the first frame 11 to the second frame 12 by adhesion or the like.

The second frame 12 can be a long or elongate body (e.g., curved or in the form of an arc) that can be formed of a second material differing from the first material, can have the closed cross section 12a, and can extend in the longitudinal direction X of the vehicle 1.

For example, the second frame 12 can be manufactured by using, as the second material, a reinforced fiber resin such as CFRP that can be reinforced by carbon fiber or the like.

Compared to the metal material such as aluminum or steel that can be adopted as the above first material of the first frame 11, the reinforced fiber resin such as the CFRP can have properties of being lightweight (that is, weight per unit weight (or specific weight) is light) and having high tensile strength (further in detail, rigidity such as torsional rigidity or bending rigidity is high).

As illustrated in FIG. 6, the second frame 12 can have the shape that has the closed cross section 12a when being cut in the vehicle width direction Y of the vehicle 1. The closed cross section 12a can include a first frame fixed section 12b, an outer surface constituting section 12c, and a weather strip attachment section 12d. Each of the first frame fixed section 12b, the outer surface constituting section 12c, and the weather strip attachment section 12d can be manufactured, for instance, by using a fiber-reinforced resin material in a thin plate shape formed from the CFRP and the like. Each of the fiber-reinforced resin material in the thin plate shape can be oriented such that the reinforced fiber such as the carbon fiber can extend in a longitudinal direction (primarily, the vehicle longitudinal direction X) of the second frame 12. The second frame 12, for instance, having the closed cross section 12a, can be manufactured by joining the first frame fixed section 12b, the outer surface constituting section 12c, and the weather strip attachment section 12d at the time of sintering of the carbon fiber. Due to such a structure that can be formed of the fiber-reinforced resin material and can have the closed cross section 12a, the second frame 12 can have the higher tensile strength and can be lighter (that is, weight per unit weight (or specific weight) is lighter) than the first frame 11. In the front cross-sectional view of the first frame 11 and the second frame 12, a center C2 (e.g., as shown in the FIG. 6) of the second frame 12 can be arranged on the outer side Y1 in the vehicle width direction from a center C1 (e.g., as shown in FIG. 6) of the first frame 11 with respect to vehicle center CL.

Here, the "front cross-sectional view" can mean a cross-sectional view in which cross sections of the first frame 11 and the second frame 12 in an extending direction are seen from the front side of the vehicle. The center C1 of the figure can mean center (center of gravity) of the cross section in the vehicle width direction of the first frame 11. The center C2 of the figure can means center (center of gravity) of the cross section in the vehicle width direction of the second frame 12.

As illustrated in FIG. 2, a position of the vehicle center CL in the vehicle width direction Y can be located at center of the vehicle 1 in a vehicle front view, and can be the same as center of gravity G of the vehicle 1.

The first frame fixed section 12b can include a first fixed surface 12b1 and a second fixed surface 12b2 as two fixed surfaces that can be fixed to the two outer sides 11b, 11c of the first frame 11, respectively. That is, the first fixed surface 12b1 can be fixed to the outer side 11b, and the second fixed surface 12b2 can be fixed to the outer side 11c.

The first fixed surface 12b1 and the second fixed surface 12b2 can be oriented in different directions and can be orthogonal to each other, for instance, in this embodiment illustrated in FIGS. 3 to 6.

In this embodiment, as illustrated in FIG. 6, the at least two fixed surfaces 12b1, 12b2 of the second frame 12 can be respectively adhered to the at least two outer sides 11b, 11c of the first frame 11.

More specifically, a first adhesive surface 12f1, which can be a lower surface of the first fixed surface 12b1 and will be described below, can oppose the first outer side 11b, which can be an upper surface of the first frame 11 and can face the outer side Y1 in the vehicle width direction and obliquely upward, and can be adhered to the first outer side 11*b* by an adhesive 13.

A third adhesive surface 12*h*, which can be a surface facing an inner side Y2 in the vehicle width direction of the second fixed surface 12*b*2 and will be described below, can oppose the second outer side 11*c*, which can face the outer side Y1 in the vehicle width direction of the first frame 11 and obliquely downward, and can be adhered to the second outer side 11*c* by an adhesive 15.

In this embodiment, the adhesives 13, 15 can be separated, but alternatively may be connected.

The outer surface constituting section 12*c* can be a portion that can be seen from the outside of the vehicle 1, and can constitute a part of a design surface of the vehicle 1.

The weather strip attachment section 12*d* can have a fitting concave section 12*d*1 (see FIG. 6) that can face and can be opened to the outer side Y1 in the vehicle width direction of the vehicle 1. The fitting concave section 12*d*1 may be a groove that extends in the vehicle longitudinal direction X, and a weather strip that can be formed of a long resin material can be attached thereto.

In this embodiment, since the weather strip attachment section 12*d* can be integrally formed in the second frame 12, a bulge, a seam, or the like that may otherwise be formed at the time when another member is attached may not be formed. As a result, design quality of the vehicle 1 can be improved.

The fixed surfaces 12*b*1, 12*b*2 may be fixed to the outer sides 11*b*, 11*c* by a method other than the adhesion via adhesives such as riveting or by both of the adhesion and riveting.

As illustrated in FIG. 6, for instance, the closed cross section 12*a* (more specifically, the first fixed surface 12*b*1 of the first frame fixed section 12*b*) in the second frame 12 can have the lower surface 12*f*.

The flange section 5*b* of the roof panel 5 can be fixed to the lower surface 12*f* of the closed cross section 12*a* in the roof side rail 3.

More specifically, in a portion of the second frame 12 that extends in parallel with the roof panel 5, the closed cross section 12*a* can have an inward extending section 12*g* that extends to the inner side Y2 in the vehicle width direction Y from a position in the second frame 12 above the first frame 11. That is, the first frame fixed section 12*b* and the outer surface constituting section 12*c*, which can constitute the closed cross section 12*a* of the second frame 12, can project to or toward the inner side Y2 in the vehicle width direction Y from the first outer side 11*b* in an upper portion of the first frame 11. In this way, the inward extending section 12*g* of the closed cross section 12*a* can be formed. A second adhesive surface 12*f*2, which will be described below, can be arranged on a lower surface of the inward extending section 12*g*.

Meanwhile, the above flange section 5*b* that can be projected to the outer side Y1 in the vehicle width direction Y can be formed on each of the sides in the vehicle width direction Y of the roof panel 5. The flange section 5*b* can be adhered to the second adhesive surface 12*f*2, which can be arranged on the lower surface of the inward extending section 12*g* in the closed cross section 12*a*. In this way, end portions on both of the sides of the roof panel 5 can be fixed to the paired roof rails 3.

According to one or more embodiments, the flange section 5*b* can be adhered to the lower surface 12*f* of the closed cross section 12*a* by an adhesive 14 and can be fastened thereto by a fastener B such as a bolt, a rivet, or the like.

In this embodiment, as illustrated in FIG. 6, the closed cross section 12*a* of the second frame 12 can extend in the vehicle width direction Y in a manner to cover the first frame 11 and the flange section 5*b* from above.

The lower surface 12*f* of the closed cross section 12*a* can have: the first adhesive surface 12*f*1 that can be adhered to the first outer side 11*b* as the upper surface of the first frame 11; and the second adhesive surface 12*f*2 that can be adhered to the flange section 5*b*. The first adhesive surface 12*f*1 and the second adhesive surface 12*f*2 can be arranged on the substantially same plane.

As illustrated in FIG. 6, the second frame 12 further can have the third adhesive surface 12*h* that can be oriented to a different direction on the outer side Y1 in the vehicle width direction from the first adhesive surface 12*f*1, in this embodiment, an orthogonal direction. The first frame 11 further can have the second outer side 11*c* that can be a side surface adjacent to the first outer side 11*b* as an upper surface.

The first adhesive surface 12*f*1 can be adhered to the first outer side 11*b* as the upper surface of the first frame 11 by the adhesive 13, and the third adhesive surface 12*h* can be adhered to the second outer side 11*c* as a side surface of the first frame 11 by the adhesive 15.

(Exemplary Characteristics of this Embodiment and Additional Embodiments)

(1)

As illustrated FIGS. 1 to 3 and FIG. 7, the vehicle body structure of the automobile according to this embodiment can be the vehicle body structure of the automobile and can include: the paired roof side rails 3, each of which can constitute the at least one (two in this embodiment) each of the closed cross sections 11*a*, 12*a* and can extend in the vehicle longitudinal direction X; and the roof panel 5 that can be stretched between the paired roof side rails 3 and can extend in the vehicle width direction Y. The roof panel 5 can have: the body section 5*a* that can extend in the vehicle width direction Y; and the flange section 5*b* that can be provided to both of the end portions of the body section 5*a* in the vehicle width direction Y and can extend in the vehicle width direction Y along the lower surface 12*f* of the closed cross section 12*a*. The flange section 5*b* can be fixed to the lower surface 12*f* of the closed cross section 12*a* in the roof side rail 3.

With such a configuration, when the flange section 5*b* of the roof panel 5 is fixed to the lower surface 12*f* of the closed cross section 12*a* of the roof side rail 3, it can be possible to increase strength against a tensile load that may be applied to the roof panel 5. In addition, since the flange section 5*b* can be fixed to the lower surface 12*f* of the closed cross section 12*a* of the roof side rail 3, the flange section 5*b* may not be visually recognized from the outside, and the step portion that may be provided in the conventional vehicle body structure may not be formed. As a result, it can be possible to simultaneously achieve firm fixing between the roof panel 5 and the roof side rails 3 and improvement in the design quality of the vehicle body.

(2)

In the vehicle body structure of the automobile in this embodiment, as illustrated in FIG. 6, the flange section 5*b* can be adhered to the lower surface 12*f* of the closed cross section 12*a* by the adhesive 14 and can be fastened thereto by the fastener B.

With such a configuration, the flange section 5*b* can be fixed by both of the adhesion to the lower surface 12*f* of the closed cross section 12*a* of the roof side rail 3 using the adhesive 14 and fastening using the fastener B. Thus, the roof panel 5 can further firmly be fixed to the roof side rail 3. That is, in this configuration, since the flange section 5*b* is less likely to be detached from the lower surface 12*f* of the closed cross section 12*a* of the roof side rail 3 due to fastening by the fastener B, it can be possible to suppress separation of the adhesive 14. In addition, due to the adhesion by the adhesive 14, the flange section 5*b* can be less likely to be shifted along the lower surface 12*f* of the closed cross section 12*a*. Thus, it can be possible to prevent damage caused by concentration of stress on the flange section 5*b* at a position of the fastener B. Due to these synergistic effects, it can be possible to further firmly fix the roof panel 5 to the roof side rail 3 as described above.

(3)

In the vehicle body structure of the automobile according to this embodiment, as illustrated in FIG. 6, the roof side rail 3 can be constructed of the first frame 11 and the second frame 12, which can be adhered to the first frame 11. The first frame 11 can have the closed cross section 11*a*, and the second frame 12 can have the closed cross section 12*a*. The closed cross section 12*a* of the second frame 12 can extend in the vehicle width direction Y in the manner to cover the first frame 11 and the flange section 5*b* from above. The lower surface 12*f* of the closed cross section 12*a* of the second frame 12 can have: the first adhesive surface 12*f*1 that can be adhered to the first outer side 11*b* as the upper surface of the first frame 11; and the second adhesive surface 12*f*2 that can be adhered to the flange section 5*b*. The first adhesive surface 12*f*1 and the second adhesive surface 12*f*2 can be arranged on the substantially same plane (e.g., on the same plane).

With such a configuration, the roof side rail 3 can be constructed of the first frame 11 and the second frame 12. In the first adhesive surface 12*f*1 and the second adhesive surface 12*f*2, which can be arranged on the substantially same plane, the closed cross section 12*a* of the second frame 12 can be adhered to the upper surface of the first frame 11 and the flange section 5*b*. In this configuration, even in the case where a load in a shearing direction that may be applied to the roof panel 5 is applied to the second frame 12 via the second adhesive surface 12*f*2, which can be adhered to the flange section 5*b*, it can be possible to transmit the load applied in the shearing direction to the first frame 11 via the first adhesive surface 12*f*1 that can be on the substantially same plane as the second adhesive surface 12*f*2. In this way, a load applied to the first adhesive surface 12*f*1 in an out-of-plane direction, that is, the load that may cause or try to cause separation of the first adhesive surface 12*f*1 is less likely to be generated. As a result, it can be possible to increase the strength of the roof panel 5 against the load applied in the shearing direction.

In regard to the above "substantially same plane", for example, in the case where an inclination of the second adhesive surface 12*f*2 with respect to the first adhesive surface 12*f*1 is set to be equal to or smaller than 20 degrees, the load that may be applied to the adhesive surfaces 12*f*1, 12*f*2 in the shearing direction can be increased with respect to a load in the vehicle width direction Y that may be transmitted from the roof panel 5 to the second frame 12. Thus, it can be possible to prevent fractures of the adhesive surfaces 12*f*1, 12*f*2. Since the loads in a peeling direction on the adhesive surfaces 12*f*1, 12*f*2 may be increased with an increase in the inclination, the first adhesive surface 12*f*1 and the second adhesive surface 12*f*2 can be on the same plane.

(4)

In the vehicle body structure of the automobile according to this embodiment, as illustrated in FIG. 6, the closed cross section 12*a* of the second frame 12 can have the inward extending section 12*g* that can extend to the inner side Y2 in the vehicle width direction Y from the position in the second frame 12 above the first frame 11. The second adhesive surface 12*f*2 can be arranged on the lower surface of the inward extending section 12*g*.

With such a configuration, the second adhesive surface 12*f*2, which can be adhered to the flange section 5*b* of the roof panel 5, in the second frame 12 can be arranged on the lower surface of the closed cross section 12*a* of the second frame 12, more specifically, the lower surface of the inward extending section 12*g* that can extend to the inner side Y2 in the vehicle width direction Y in the closed cross section 12*a*. In this way, it can be possible to support the second adhesive surface 12*f*2, which can be adhered to the flange section 5*b*, by the closed cross section 12*a* of the second frame 12 and thus can secure the tensile strength of the second adhesive surface 12*f*2. In addition, the inward extending section 12*g* of the second frame 12 can extend to the inner side Y2 in the vehicle width direction Y from the position above the first frame 11 and can approach the body section 5*a* of the roof panel. In this way, it can be possible to reduce a clearance between the body section 5*a* of the roof panel and the second frame 12, which can improve the design quality of the vehicle body.

(5)

As illustrated in FIG. 6, in the vehicle body structure of the automobile according to this embodiment, the second frame 12 further can have the third adhesive surface 12*h*, which can be oriented to the different direction on the outer side Y1 in the vehicle width direction from the first adhesive surface 12*f*1. The first frame 11 further can have the second outer side 11*c* that can be the side surface adjacent to the first outer side 11*b* as the upper surface. The first adhesive surface 12*f*1 can be adhered to the first outer side 11*b* as the upper surface of the first frame 11, and the third adhesive surface 12*h* can be adhered to the second outer side 11*c* as the side surface of the first frame 11.

With such a configuration, not only to the first adhesive surface 12*f*1 of the second frame 12 but also the third adhesive surface 12*h*, which can be oriented in the different direction from the first adhesive surface 12*f*1, can be adhered to the first frame 11. Accordingly, even in the case where the load in the shearing direction, which applied to the roof panel 5, is applied to the second frame 12, such a possibility can be reduced that the second frame 12 is separated from the first frame 11 and can move relative to the first frame 11.

(6)

In the vehicle body structure of the automobile according to this embodiment, the second frame 12 can have the higher tensile strength and can be lighter than the first frame 11. The center C2 (e.g., as shown in the figure) of the second frame 12 can be arranged on the outer side Y1 in the vehicle width direction from the center C1 (e.g., as shown in the drawing) of the first frame 11 with respect to vehicle center CL.

With such a configuration, the center C2 of the figure of the second frame 12, which can have the higher tensile strength and can be lighter than the first frame 11, can be arranged on the outer side Y1 in the vehicle width direction from the center C1 of the first frame 11 with respect to the vehicle center CL. In this way, the modification of the vehicle body can be suppressed while moment of inertia with respect to the vehicle center CL can be reduced during travel of the vehicle 1. Thus, it can be possible to simultaneously reduce weight of the vehicle body and improve steering stability of the vehicle 1. In addition, compared to a case where the single frame having the plural closed cross sections is formed of the same material such as aluminum, it can be possible to suppress an increase in external dimensions of the first frame 11 and the second frame 12 formed of the different types of the materials, and it also can be possible to improve the freedom of the design of the vehicle body.

In other words, it can be possible to reduce the moment of inertia of the vehicle body with respect to the vehicle center CL by arranging the second frame 12, which can be the lightweight member, away from the vehicle center CL. In addition, since the second frame 12 can be located away from the vehicle center CL, cross-sectional secondary moment of the second frame 12 with respect to the vehicle center CL can be increased. Furthermore, since the tensile strength of the second frame 12 can be high, it can be possible to suppress torsional deformation of the vehicle body and improve the steering stability.

The second frame 12 can be fixed to the side surface on the outer side Y1 in the vehicle width direction of the first frame 11, can extend to the inner side Y2 in the vehicle width direction along the upper surface of the first frame 11, and can be coupled to the roof panel 5. In this way, it can be possible to reliably transmit the load that may be applied to the roof panel 5 to the first frame 11 and the second frame 12.

The invention claimed is:

1. A vehicle body structure of an automobile, the vehicle body structure comprising:
   a pair of roof side rails that constitutes at least one closed cross section and extends in a vehicle longitudinal direction; and
   a roof panel that extends between the pair of roof side rails in a vehicle width direction, wherein the roof panel has: a body section that extends in the vehicle width direction; and a flange section that is provided to both end portions in the vehicle width direction of the body section and extends in the vehicle width direction along a lower surface of the at least one closed cross section, wherein
   the flange section is fixed to the lower surface of the at least one closed cross section,
   each of the roof side rails is constructed of a first frame and a second frame that is adhered to said first frame, each of the first frame and the second frame forms respective closed cross sections of said at least one closed cross section,
   the closed cross section of the second frame extends in the vehicle width direction so as to cover the first frame and the flange section from above, and
   the second frame forms the lower surface of the closed cross section and has: a first adhesive surface that is adhered to an upper surface of the first frame; and a second adhesive surface that is adhered to the flange section, and the first adhesive surface and the second adhesive surface of the second frame are arranged on the substantially same plane.

2. The vehicle body structure according to claim 1, wherein the flange section is adhered to the lower surface of the closed cross section by an adhesive and is fastened thereto by a fastener.

3. The vehicle body structure according to claim 1, wherein
   the closed cross section of the second frame has an inward extending section that extends to an inner side in the vehicle width direction from a position above the first frame in the second frame, and
   the second adhesive surface of the second frame is arranged on a lower surface of the inward extending section.

4. The vehicle body structure according to claim 1, wherein
   the second frame further has a third adhesive surface that is oriented to a different direction on an outer side in the vehicle width direction with respect to the first adhesive surface,
   the first frame further has a side surface that is adjacent to the upper surface, and
   the first adhesive surface is adhered to the upper surface of the first frame, and the third adhesive surface is adhered to the side surface of the first frame.

5. The vehicle body structure according to claim 1, wherein
   the second frame has higher tensile strength and is lighter than the first frame, and
   a center associated with the second frame is arranged on an outer side in the vehicle width direction of a center associated with the first frame with respect to a vehicle center in a front cross-sectional view of the vehicle.

6. The vehicle body structure according to claim 3, wherein
   the second frame has higher tensile strength and is lighter than the first frame, and
   a center associated with the second frame is arranged on an outer side in the vehicle width direction of a center associated with the first frame with respect to a vehicle center in a front cross sectional view of the vehicle.

7. The vehicle body structure according to claim 4, wherein
   the second frame has higher tensile strength and is lighter than the first frame, and
   a center associated with the second frame is arranged on an outer side in the vehicle width direction of a center associated with the first frame with respect to a vehicle center in a front cross-sectional view of the vehicle.

8. The vehicle body structure according to claim 5, wherein
   the pair of roof side rails constitute an upper portion of a vehicle body,
   each of the roof side rails is constructed from at least the first frame and the second frame, and
   the first frame is made of a first material and the second frame is made of a second material different from the first material.

9. The vehicle body structure according to claim 8, wherein
   the first material of the first frame is metal, and the second material of the second frame is a reinforced fiber resin that is reinforced by carbon fiber.

10. The vehicle body structure according to claim 1, wherein
    the first frame extends in the vehicle longitudinal direction of the vehicle,
    the first frame has a polygonal shape with plural sides in a front cross-sectional view of the vehicle,
    the polygonal shape is a rhomboid in the front cross-sectional view of the vehicle, and
    the plural sides of the first frame form the rhomboid and the closed cross section of the first frame in the front cross-sectional view of the vehicle.

11. The vehicle body structure according to claim 10, wherein the plural sides have at least two outer sides with which a surface constituting an outer circumferential surface of the first frame faces an outer side in the vehicle width direction, a first outer side of the at least two outer sides faces the outer side in the vehicle width direction and obliquely upward, and a second outer side of the at least two outer sides faces the outer side in the vehicle width direction and obliquely downward.

12. The vehicle body structure according to claim 8, wherein the second frame extends in the vehicle longitudinal direction of the vehicle, the second frame includes a first frame fixed section, an outer surface constituting section, and a weather strip attachment section, and the first frame fixed section, the outer surface constituting section, and the weather strip attachment section form the second form the second closed cross section of the second frame.

13. The vehicle body structure according to claim 1, wherein each of the roof side rails is comprised of the first frame and h second frame connected to the first frame, the first frame has a polygonal shape with plural sides in a front cross-sectional view of the vehicle, the plural sides have the at least two outer sides with which a surface constituting an outer circumferential surface of the first frame faces an outer side in the vehicle width direction, and of the plural sides, only the at least two outer sides of the first frame are adhered to the second frame.

14. The vehicle body structure according to claim 1, wherein each of the roof side rails is comprised of the first frame and the second frame connected to the first frame, and the flange section of the roof panel is fixed to the lower surface of the closed cross section such that an upper surface of the flange section is adhered to the lower surface of the closed cross section via an adhesive and such that a portion of an inward extending section of the second frame is fastened to the flange section of the roof panel.

15. The vehicle body structure according to claim 1, wherein the flange section of the roof panel is inward of the first frame in the vehicle width direction, and the first frame is fixed to the lower surface of one said at least one closed cross section.

\* \* \* \* \*